(12) United States Patent
Saitou et al.

(10) Patent No.: US 9,605,192 B2
(45) Date of Patent: Mar. 28, 2017

(54) ADHESIVE COMPOSITION AND PRODUCTION METHOD THEREOF

(71) Applicant: Auto Chemical Industry Co., Ltd., Tokyo (JP)

(72) Inventors: Sou Saitou, Ibaraki-ken (JP); Shinichi Iwase, Ibaraki-ken (JP); Atsuhiko Umezawa, Ibaraki-ken (JP)

(73) Assignee: Auto Chemical Industry Co., Ltd., Tokyo (JP)

(*) Notice: Subject to any disclaimer, the term of this patent is extended or adjusted under 35 U.S.C. 154(b) by 98 days.

(21) Appl. No.: 14/558,087

(22) Filed: Dec. 2, 2014

(65) Prior Publication Data
US 2015/0152300 A1 Jun. 4, 2015

(30) Foreign Application Priority Data

Dec. 3, 2013 (JP) ................... 2013-249836
Oct. 30, 2014 (JP) ................... 2014-221104

(51) Int. Cl.
| | |
|---|---|
| C09J 187/00 | (2006.01) |
| C08G 81/02 | (2006.01) |
| C08G 18/48 | (2006.01) |
| C08G 18/75 | (2006.01) |
| C09J 163/00 | (2006.01) |
| C09J 175/04 | (2006.01) |
| C09J 123/00 | (2006.01) |
| C08L 23/08 | (2006.01) |
| C08L 75/04 | (2006.01) |

(52) U.S. Cl.
CPC ...... *C09J 187/005* (2013.01); *C08G 18/4854* (2013.01); *C08G 18/755* (2013.01); *C08G 81/024* (2013.01); *C08L 23/0869* (2013.01); *C08L 75/04* (2013.01); *C09J 123/00* (2013.01); *C09J 163/00* (2013.01); *C09J 175/04* (2013.01); *C08G 2170/80* (2013.01); *C08L 2201/54* (2013.01)

(58) Field of Classification Search
CPC ...... C09J 175/00; C09J 175/04; C09J 175/06; C09J 175/08; C09J 175/10
USPC ........................................ 525/123
See application file for complete search history.

(56) References Cited

U.S. PATENT DOCUMENTS

| | | | |
|---|---|---|---|
| 9,133,317 B2* | 9/2015 | Asami | C08G 18/0823 |
| 2002/0040098 A1* | 4/2002 | Maekawa | C08L 51/006 |
| | | | 525/88 |
| 2006/0204895 A1* | 9/2006 | Sailer | C08G 18/0823 |
| | | | 430/273.1 |

(Continued)

FOREIGN PATENT DOCUMENTS

| | | |
|---|---|---|
| JP | 2002-080686 A | 3/2002 |
| JP | 2004-197048 A | 7/2004 |
| JP | 2010-180290 A | 8/2010 |

OTHER PUBLICATIONS

Machine Translation of JP 2001254012 A.*

*Primary Examiner* — Mike M Dollinger
(74) *Attorney, Agent, or Firm* — Thompson Coburn LLP

(57) ABSTRACT

An adhesive composition contains a polyurethane-polyolefin complex composed of a polyurethane having a first functional group and a polyolefin having a second functional group that reacts with the first functional group. The polyurethane and the polyolefin is bound by a reaction between the first functional group and the second functional group.

1 Claim, 1 Drawing Sheet

(56) References Cited

U.S. PATENT DOCUMENTS

| | | | | |
|---|---|---|---|---|
| 2008/0039594 A1* | 2/2008 | Moeller | ............. | C09J 115/00 |
| | | | | 525/523 |
| 2008/0099141 A1* | 5/2008 | Booth | ............. | C08G 18/289 |
| | | | | 156/331.7 |
| 2013/0281636 A1* | 10/2013 | Hartig | ............. | C08F 283/006 |
| | | | | 525/440.08 |
| 2015/0152300 A1* | 6/2015 | Saitou | ............. | C08G 81/024 |
| | | | | 525/123 |

* cited by examiner

ADHESIVE COMPOSITION AND PRODUCTION METHOD THEREOF

CROSS REFERENCE TO RELATED APPLICATIONS

This application claims the benefit of Japanese Patent Application Nos. 2013-249836 and 2014-221104, filed Dec. 3, 2013 and Oct. 30, 2014, respectively, which are hereby incorporated by reference in their entirety.

BACKGROUND

Technical Field

The present disclosure relates to an adhesive composition and a production method thereof.

Background

Adhesive compositions are used in various applications in the related art. For example, Japanese Laid-Open Patent Publication No. 2004-197048 discloses an aqueous adhesive used for adhesion between a decorative sheet and a base material that includes an ethylene-vinyl acetate copolymer based emulsion (A), an anionic urethane resin emulsion (B) and an aqueous urethane resin (C), and contains 1 to 50 parts by weight of the aqueous urethane resin (C) per 100 parts by weight of a solid content of a sum of the ethylene-vinyl acetate copolymer based emulsion (A) and the anionic urethane resin emulsion (B).

Japanese Laid-Open Patent Publication No. 2010-180290 discloses, as an adhesive composition that is preferably used in color displays devices such as liquid crystal displays, an adhesive composition including 100 parts by weight of an urethane resin (A) and 5 to 30 parts by weight of a polyisocyanate hardening agent (B) added thereto, wherein the urethane resin (A) is polyurethane (Ax) obtained by reaction between polyisocyanate (a1), polyol (a2) and dioxycarboxylic acid (a3) having two hydroxyl groups and one carboxyl group in a single particle, or polyurethane urea (Ay) that is obtained by further reacting diamine (A4) with the polyurethane (Ax), and also that the urethane resin (A) has an acid value of 20 to 80 mgKOH/g.

A large quantity of rubber materials such as EPDM, nitrile rubber, butadiene rubber has been used for components of various products for a long time. Also, recently, a large quantity of polyolefin based resins are used for household appliances and plastics for automobile parts due to their good resin properties such as workability, water resistance and oil resistance and also due to their cost effectiveness. Attempts have been made in applying coating on a surface of rubber material to a polyolefin based resin molded article and in forming a laminate with other resins to give an increased added value to rubber materials and polyolefin based resins. However, there is a problem that rubber materials and polyolefin based resin have bad adhesiveness with general coatings and other resins. None of Japanese Laid-Open Patent Publication No. 2004-197048 and Japanese Laid-Open Patent Publication No. 2010-180290 disclose or suggest improving adhesiveness of hard-to-bond adhesive material such as rubber materials and polyolefin based resins.

As a technique related to the hard-to-bond adhesive material, Japanese Laid-Open Patent Publication No. 2002-080686 discloses an aqueous dispersion having improved adhesiveness and adhesion to a non-polar base material such as a polyolefin resin, particularly polypropylene, and obtained by combining a polyurethane based resin (II) to an aqueous dispersion (I) in which a block copolymer (I) comprising a polymeric block (A) that is mainly composed of an olefin based monomeric unit and a polymeric block (B) that is composed of 2 to 100 mol % of vinyl based monomeric units having a carboxyl group or an anhydrous carboxylic acid group and 98 to 0 mol % of another vinyl monomer that can be copolymerized with the vinyl based monomeric units is dispersed into a water solution of a basic substance of 0.05 equivalents or more to the carboxyl group or to the anhydrous carboxylic acid group.

The present disclosure is related to providing a novel adhesive material composition having a good adhesiveness to hard-to-bond materials such as rubber materials or polyolefin based resins.

SUMMARY

According to a first aspect of the present disclosure, an adhesive composition contains a polyurethane-polyolefin complex composed of a polyurethane having a first functional group and a polyolefin having a second functional group that reacts with the first functional group, the polyurethane and the polyolefin being bound by a reaction between the first functional group and the second functional group.

Further, in the above adhesive composition, a combination of the first functional group and the second functional group is one of (carboxyl group, hydroxyl group), (hydroxyl group, carboxyl group), (carboxyl group, epoxy group), (acid anhydride group, epoxy group), (epoxy group, carboxyl group), (epoxy group, acid anhydride group), (amino group, epoxy group), (isocyanate group, hydroxyl group), (isocyanate group, epoxy group) and (epoxy group, amino group).

Further, in the above adhesive composition, the polyurethane having the first functional group includes
(1-i) 5 to 40 mass % of a constitutional unit derived from at least one kind of polyisocyanate,
(1-ii) 1 to 20 mass % of a constitutional unit derived from at least one kind of a compound represented by general formula (I) below, and
(1-iii) 10 to 80 mass % of a constitutional unit derived from at least one kind of polyol that is different from the (1-ii)-component.

[Chemical Formula 1]

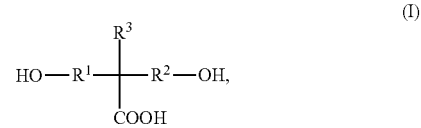

where $R^1$ and $R^2$ each represents a $C_1$-$C_4$-alkylene group independently and respectively, and $R^3$ represents a $C_1$-$C_4$-alkyl group.

Further, in the above adhesive composition, the polyolefin having the second functional group includes
(2-i) 50 to 97 mass % of a constitutional unit derived from $C_2$-$C_{20}$-α-olefin,
(2-ii) 3 to 30 mass % of a constitutional unit derived from at least one kind of a compound represented by general formula (II) below, and
(2-iii) 0 to 30 mass % of a constitutional unit derived from another monomer that can be copolymerized except vinyl acetate.

[Chemical Formula 2]

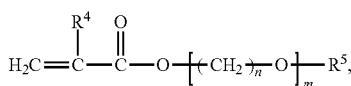
(II)

where $R^4$ represents hydrogen or a methyl group and $R^5$ is any one of general formulae (IIa) to (IIc) below:

[Chemical Formula 3]

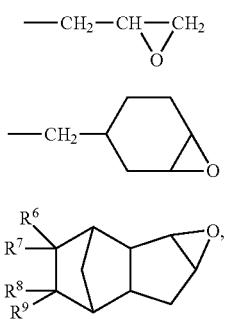

where n is an integer of 2 to 4, m is an integer of 0 or 1 to 5. Any one of $R^6$, $R^7$, $R^8$ and $R^9$ represents a bonding position with an oxyalkylene group of the aforementioned formula (II) and another group represent an alkyl group of hydrogen or carbon number of 1 to 10.

According to a second aspect of the present disclosure, a production method of an adhesive composition includes obtaining a polyurethane-polyolefin complex by mixing, with a kneader, a polyurethane having a first functional group and a polyolefin having a second functional group that reacts with the first functional group, and allowing the first functional group and the second functional group to react with each other.

According to a third aspect of the present disclosure, a production method of an adhesive composition includes obtaining a polyurethane-polyolefin complex emulsion by mixing a polyurethane dispersion having a first functional group and a polyolefin emulsion having a second functional group that reacts with the first functional group, and allowing the first functional group and the second functional group to react with each other.

DETAILED DESCRIPTION

Figure 1:
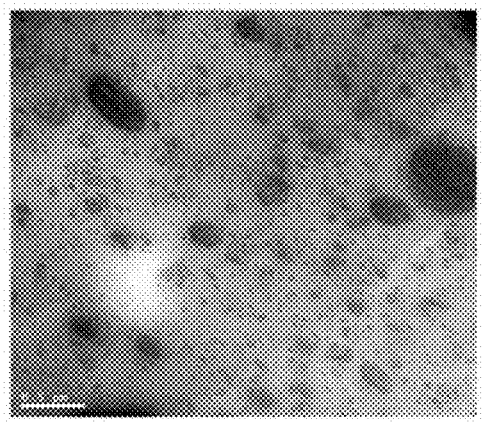
FIG. 1 shows a transmission electron microscopic image of an adhesive of Example 1.

The present disclosure relates to an adhesive composition containing a polyurethane-polyolefin complex composed of a polyurethane having a first functional group and a polyolefin having a second functional group that reacts with the first functional group, the polyurethane and the polyolefin being bound by a reaction between the first functional group and the second functional group.

The polyurethane having the first functional group is not particularly limited, but, for example, polyurethane including (1-i) 5 to 40 mass % of a constitutional unit derived from at least one kind of polyisocyanate, (1-ii) 1 to 20 mass % of a constitutional unit derived from at least one kind of a compound represented by general formula (I) below, and (1-iii) 10 to 80 mass % of a constitutional unit derived from at least one kind of polyol that is different from the (1-ii)-component may be used. (Note that each mass % is represented with respect to a total amount of (1-i) to (1-iii)). The first functional group is not particularly limited, but may be a carboxyl group, a hydroxyl group, an epoxy group, an acid anhydride group, an amino group, or an isocyanate group.

[Chemical Formula 4]

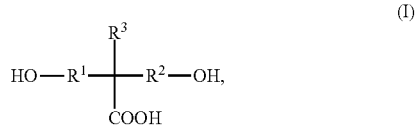
(I)

where $R^1$ and $R^2$ each represents a $C_1$-$C_4$-alkylene group independently, respectively, and $R^3$ represents a $C_1$-$C_4$-alkyl group.

The polyurethane having the first functional group may be, for example, an urethane prepolymer containing the first functional group, which urethane prepolymer being obtained by reacting a polyisocyanate with a polyol including a compound having the first functional group, and performing a chain extension reaction as necessary.

The polyisocyanate is not particularly limited as long as it is a compound having two or more isocyanate groups, but it is particularly desirably a diisocyanate. An appropriate diisocyanate is expressed by, for example, a formula $X(NCO)_2$, where X represents an aliphatic hydrocarbon group having 4 to 15 C-atoms, an alicyclic hydrocarbon group or an aromatic hydrocarbon group having 6 to 15 C-atoms or an aroma aliphatic hydrocarbon group having 7 to 15 C-atoms. Specifically, the diisocyanate may be an aromatic diisocyanate such as a toluenediisocyanate (hereinafter also referred to as a "TDI"), a diphenylmethanediisocyanate (hereinafter also referred to as a "MDI"), a diphenyldimethylmethanediisocyanate, a dibenzyldiisocyanate, a naphthylenediisocyanate, a phenylenediisocyanate, a xylylenediisocyanate, and a tetramethylxylylenediisocyanate; an aliphatic diisocyanate such as a tetramethylenediisocyanate, a hexamethylenediisocyanate, a lysinediisocyanate, a 2-methylpentane-1,5-diisocyanate, a 3-methylpentane-1,5-diisocyanate, a 2,2,4-trimethylhexamethylene-1,6-diisocyanate, and a 2,4,4-trimethylhexamethylene-1,6-diisocyanate; and an alicycle group diisocyanate such as an isophoronediisocyanate (hereinafter also referred to as an "IPDI"), a cyclohexyldiisocynate, a hydrogenated xylylenediisocyanate (hereinafter also referred to as "$H_6XDI$"), a hydrogenated diphenylmethanediisocyanate (hereinafter also referred to as "$H_{12}MDI$"), and a hydrogenated tetramethylxylylenediisocyanate. Modifications such as an adduct modification, a carbodiimide modification, an allophanate modification, a burette modification, an uretdione modification, an uretonimine modification, an isocyanurate modification of the aforementioned diisocyanate may also be used. Diisocyanates and modifications thereof may be used alone or as a combination of a plurality of kinds thereof. Preferred polyisocyanates among these are an aliphatic diisocyanate and an alicycle diisocyanate, and an isophorone diisocyanate is particularly preferable. An amount of the polyisocyanate or the modification thereof is in a range of 5 to 40 mass %, preferably 15 to 35 mass % and particularly preferably 20 to 30 mass %, with respect to a sum (amount prepared) of the polyisocyanate or the modification thereof, (1-ii) the compound represented by the general formula (I), and the polyol of (1-iii).

The (1-iii) polyol which is different from the compound represented by the general formula (I) below is not particularly limited as long as it is a polyol having two or more hydroxyl groups, and may be a low molecular polyol, a polyester polyol, a polyether polyol, a polycarbonate polyol. Further, various kinds of compositions containing two or more active hydrogen groups, such as an urea resin, an acrylic acid resin, a melamine resin, an epoxy resin, a polyester resin, a polyvinyl alcohol, may be used.

The low molecular polyol (carbon number 2 to 20) may be, for example, a dihydroxy alcohol [aliphatic diol (ethylene glycol, propylene glycol, 1,3- or 1,4-butanediol, 1,6-dihydroxyhexane, neopentylglycol, and 1,10-decanediol, or the like), an alicyclic diol (cyclohexanediol and a cyclohexanedimethanol, or the like) such as aroma aliphatic diol {1,4-bis(hydroxyethyl)benzene, or the like}].

The polyester polyol may be a compound obtained from a dehydration condensation reaction of one or more of a polycarboxylic acid such as phthalic acid, isophthalic acid (hereinafter also referred to as "iPA"), terephthalic acid, naphthalenedicarboxylic acid, succinic acid, tartaric acid, oxalic acid, malonic acid, glutaric acid, adipic acid, pimelic acid, suberic acid, glutaconic acid, azelaic acid (hereinafter also referred to as "AZA"), sebacic acid, 1,4-cyclohexyl dicarboxylic acid, α-butyl-α-ethyl glutaric acid, α,β-diethyl succinic acid, maleic acid, fumaric acid, hemi-melittin acid, trimellitic acid, pyromellitic acid, and benzophenone tetracarboxylic acid, or acid anhydrides thereof or the like, and one or more of a low molecular (carbon number 2 to 20) diol or a low molecular (carbon number 2 to 20) triol such as ethylene glycol (hereinafter also referred to as "EG"), diethylene glycol, dipropylene glycol, 1,2-propanediol, 1,3-propanediol, 1,2-butanediol, 1,3-butanediol, 1,4-butanediol, 1,5-pentanediol, 1,6-hexanediol (hereinafter also referred to as "1,6-HD"), 3-methyl 1,5-pentanediol, 1,8-octanediol, 1,9-nonanediol, neopentylglycol (hereinafter also referred to as "NPG"), diethylene glycol, dipropylene glycol, cyclohexane-1,4-diol, cyclohexane-1,4-dimethanol, dimer acid diol, bisphenol A alkylene oxide (such as an ethylene oxide or a propylene oxide) adduct, trimethylolpropane, glycerin, hexanetriol, Quodorole, or the like. Further, a lactone based polyester polyol obtained from ring-opening polymerization of a cyclic ester (so-called lactone) monomer such as ε-caprolactone, alkyl substituted ε-caprolactone, δ-valerolactone, or alkyl substituted δ-valerolactone may be used.

These polyester polyols are preferably polyester diols having an acid component of aromatic dicarboxylic acid/aliphatic dicarboxylic acid=35/65 to 65/35 (weight ratio), and, further, it is preferable to use a low molecular polyol having a carbon number of 8 or less as a polyol component.

The polyetherpolyol may be a compound obtained by addition polymerization from ethylene oxide (hereinafter also referred to as "EO"), propylene oxide (hereinafter also referred to as "PO"), butylene oxide, alkyl glycidyl ether such as methyl glycidyl ether, aryl glycidyl ether such as phenyl glycidyl ether, a cyclic ether monomer such as tetrahydrofuran as a simple substance or a mixed product, with a known method using, as an initiator, a compound having two or more active hydrogen group, such as the above-mentioned low molecular polyol and glycerin, trimethylolpropane, pentaerythritol, sorbitol, as well as sugar alcohols such as sucrose, glucose, fructose, diaminoethane, propylene diamine, toluenediamine, m-phenylenediamine, diphenyl methanediamine, and xylylene diamine. With these polyetherpolyol, it is preferable to use a polytetramethylene glycol (PTMG).

The polycarbonate polyol may be a compound obtained by dealcoholization reaction, de-glycol reaction or de-phenol reaction of one or more kinds of the aforementioned a low molecular polyol of a polyester polyol source and one of dialkyl carbonate, dialkylene carbonate, and diphenyl carbonate. Also, a copolymer with the aforementioned polyester polyol or polyetherpolyol may also be used. With these polycarbonate polyol, polycarbonate diol using 1,6-HD is preferable, and compounds including greater than or equal to 50 mol % of 1,6-HD in raw polyol is more preferable.

A compound having the first functional group is not particularly limited, but from the viewpoint of point availability and good reactivity, it is preferable to use a compound represented by a general formula (I) below.

[Chemical Formula 5]

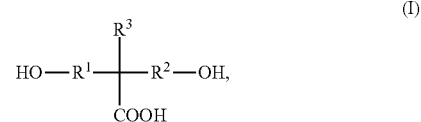

(I)

where $R^1$ and $R^2$ represent C1 to C4-alkylene groups, and $R^3$ represents C1 to C4-alkyl groups, independently and respectively. The compound represented by general formula (I) is not particularly limited, but may be 2,2-dimethylol propionic acid (hereinafter, also referred to as "DMPA"), 2,2-dimethylol butanoic acid (hereinafter, also referred to as "DMBA"), 2,2-dimethylol butyric acid, 2,2-dimethylol valeric acid, and, from the point of view of availability, 2,2-dimethylol propionic acid is preferable. It is preferable that the compound having the general formula (I) is 1 to 67 mass % to a total amount (prepared amount) of the polyol including polyol other than the compound having general formula (I), and it is further preferably 3 to 12 mass %, and it is particularly preferably 5 to 8 mass %.

The polyolefin composing the polyurethane-polyolefin complex is not particularly limited as long as it is a polyolefin having the second functional group that reacts with the first functional group. The second functional group is not particularly limited, but may be a hydroxyl group, a carboxyl group, an epoxy group, an acid anhydride group, and an amino group.

The compound having the second functional group is not particularly limited, but from the point of view of availability and a good reactivity, may be a copolymer including (2-i) 50 to 97 mass %, preferably 70 to 90 mass %, of a constitutional unit derived from $C_2$-$C_{20}$-α-olefin, (2-ii) 3 to 30 mass %, preferably 10 to 20 mass %, of a constitutional unit derived from at least one kind of a compound represented by general formula (II) indicated below, and (2-iii) 0 to 30 mass %, preferably 0 to 5 mass %, of a constitutional unit derived from another monomer that can be copolymerized other than vinyl acetate.

[Chemical Formula 6]

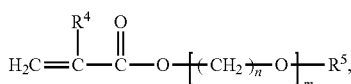
(II)

where $R^4$ represents hydrogen or a methyl group and $R^5$ is any one of general formulae (IIa) to (IIc) below:

[Chemical Formula 7]

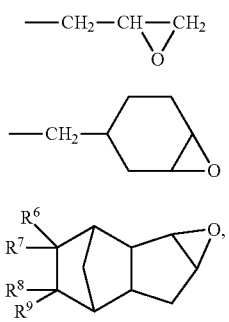

where n is an integer of 2 to 4, m is an integer of 0 or 1 to 5. Any one of $R^6$, $R^7$, $R^8$ and $R^9$ represents a bonding position with an oxyalkylene group of the aforementioned formula (II) and another group represent an alkyl group of hydrogen or carbon number of 1 to 10.

$C_2$ to $C_{20}$-α-olefin is not particularly limited, but may be one or more selected from ethylene, propylene, 1-butene, 1-pentene, 1-hexene, 4-methyl-1-pentene, 1-octene, or the like, and, among these, $C_2$ to $C_5$-α-olefine, particularly, ethylene and propylene, are preferable from the viewpoint of versatility.

The compound represented by general formula (II) is not particularly limited, but may be specifically, glycidyl(meth)acrylate, methylglycidyl(meth)acrylate, 3,4-epoxycyclohexylmethyl(meth)acrylate, 1,2-ethyleneglycolglycidylether (meth)acrylate, 1,3-propyleneglycolglycidylether(meth) acrylate, 1,4-butanediolglycidylether(meth)acrylate, 1,6-dihydroxyhexaneglycidylether(meth)acrylate, 1,3-(2-ethyl-2-butyl)-propanediolglycidylether(meth)acrylate and acrylglycidyletherglycidyl(meth)acrylate.

Other copolymerizable monomers may be, for example, (meth)acrylic acid esters such as methyl(meth)acrylate, ethyl(meth)acrylate, n-propyl(meth)acrylate, isopropyl(meth) acrylate, n-butyl(meth)acrylate, isobutyl(meth)acrylate, t-butyl(meth)acrylate, methyl 2-ethylhexy(meth)acrylate, cyclohexyl(meth)acrylate, benzyl(meth)acrylate, and 2-hydroxyethyl(meth)acrylate; aromatic vinyls such as styrene, vinyltoluene, and α-methylstyrene; N-substituted maleimides such as N-phenylmaleimide, N-cyclohexylmaleimide; butadienes or substituted butadiene compounds such as butadiene or isoprene; ethylenes or substituted ethylenic compounds such as ethylene, propylene, vinyl chloride, and acrylonitrile. Note that vinyl acetate cannot be used as other copolymerizable monomers in the adhesive composition of the present disclosure, since acetic acid is produced by heat, and thermal stability of the polyurethane-polyolefin complex decreases.

In order to produce the polyurethane-polyolefin complex of the present disclosure, mixing may be performed under the condition that the polyurethane, the polyolefin, the first functional group and the second functional group react. The mixing can normally be performed using a known mixing means, and specifically, mixing can be performed using Labo Plastomill (Toyo Seiki Seisaku-sho, Ltd./Labo Plastomill 4C150), while accelerating the reaction of the functional groups under a heated condition. The mixing ratio of the polyurethane to the polyolefin is not particularly limited, but, from the point of view of ensuring good adhesiveness, polyurethane/polyolefin=5/95 to 95/5 (mass ratio), and particularly preferably, in the range of 60/40 to 95/5. The reaction can be performed in a range of normally 170° C. to 210° C., and preferably 180° C. to 200° C. for 1 to 5 minutes, and preferably for 1 to 2 minutes. However, the polyurethane-polyolefin complex of the present disclosure is not limited to a complex obtained by such a production method, and includes a complex having a similar structure even for a different production method. For example, in the aforementioned synthesis process of the polyurethane, the complex may be formed by reacting a compound having the first functional group and the polyolefin including the second functional group. Note that, the reaction between the first functional group and the second functional group can be confirmed, as appropriate, using usually known analyzing means, e.g., a nuclear magnetic resonance spectrum (NMR) or infrared spectroscopy (IR).

Also, in the solid content of the adhesive composition, it is preferable that the polyurethane exists as a continuous phase and that the aforementioned polyurethane-polyolefin complex and/or the aforementioned polyolefin exist as a dispersed phase of a nanometer order dispersed in the continuous phase. It is preferable that the number of the aforementioned polyurethane-polyolefin complex and/or the aforementioned polyolefin that exist as the dispersed phase of a nanometer order is, from the view point of improving adhesiveness to a hard-to-bond material, 100 or more per area of 3.0 μm×3.0 μm in the solid content of the adhesive composition, and particularly preferably 300 or more per area of 3.0 μm×3.0 μm. Note that, in the present disclosure, a "nanometer order" means that a long diameter of the dispersed phase is in the range of 1 nm to 100 nm. The long diameter of the dispersed phase can be measured using a conventional transmission electron microscope (TEM).

In addition to the polyurethane-polyolefin complex, further additive components can be combined into the adhesive composition of the present disclosure as appropriate, as long as the effect is not impaired. The additives include, for example, an antioxidant, a light-resistant agent, a plasticizer, a film-forming aid, a defoaming agent, a thickener, a coloring agent, a flame retardant, other aqueous resins, various fillers, and solvents. The amount used of these additives is normally in the range of 0 mass % to 70 mass %, and preferably 0 mass % to 10 mass % to the entire composition.

The adhesive composition of the present disclosure can be used for adhesion of various kinds of products and members, particularly shows good adhesiveness to hard-to-bond materials. The hard-to-bond adhesive material is not particularly limited, and may be a rubber material, a polyolefin resin, or the like. The rubber material is not particularly limited, and may be a chloroprenerubber, a nitrilerubber, an ethylene-propylenerubber, an ethylenepropylenedienerubber (EPDM), an isobutylene-isoprenerubber, a chlorosulphonatedpolyethylenerubber, a polyurethanerubber, or a fluororubber. The polyolefin resin may be polyethylene, polypropylene, polybutene, or the like.

EXAMPLES

Hereinafter, the present disclosure will be described based on examples, but the present disclosure is not limited to the following examples.

Synthesis Example 1

Preparation of Aqueous Polyurethane Emulsion (WPU-1)

In a reactor provided with an agitator, a thermometer, a nitrogen seal pipe and a cooler, 344 parts of poly(oxytetramethylene)diol (manufactured by Hodogaya Chemistry Co., Ltd., PTG-2000SN and hereinafter referred to as "PTG-2000") of number average molecular weight 2,000, 126 parts of IPDI, and 0.03 parts of dibutyltinlaurate (hereinafter referred to as "DBTDL") were placed and reacted at 80° C. for two hours. Then, after having cooled this reaction liquid to 50° C., 23.5 parts of DMPA, 17.7 parts of triethylamine (hereinafter referred to as "TEA"), and 194 parts of acetone were added and reacted for four hours. Further, 216 parts of acetone was added to this reaction liquid and cooled to 30° C., and a mixture including 33.5 parts of isophoronediamine (hereinafter referred to as "IPDA"), 2.67 parts of monoethanolamine (hereinafter referred to as "MEA"), 103 parts of isopropylalcohol (B) (hereinafter referred to as "IPA"), and, 778 parts of water was added and stirred at a high speed. Then, the mixture was heated to 50° C. and acetone and IPA were removed from this liquid by evaporation, and an aqueous polyurethane emulsion WPU-1 with solid content 40%, viscosity coefficient 400 mPa·s/25° C. was obtained.

Synthesis Example 2

Preparation of Aqueous Polyurethane Emulsion (WPU-2)

Similarly to Synthesis Example 1, except that 26.0 parts of DMBA was used instead of DMPA, an aqueous polyurethane emulsion WPU-2 with solid content 40%, viscosity coefficient 400 mPa·s/25° C. was obtained.

Example 1

Preparation of Adhesive Composition (F-1)

WPU-1 was allowed to stand for 24 hours at 23° C. under a 50% RH atmosphere and thereafter for 24 hours at 60° C. in a constant-temperature bath, and water was removed to obtain a solid content (PU-1).

PU-1 and bondfast CG5001 (manufactured by Sumitomo Chemical Co., Ltd., an ethylene-glycidylmethacrylate copolymer) were blended such that the weight ratio is PU-1/CG5001=90/10. In order to react PU-1 and CG5001 to obtain a complex, they were heated and kneaded at 190° C. for four minutes, using a Labo Plastomill (Toyo Seiki Seisaku-sho, Ltd./Labo Plastomill 4C150), to obtain an adhesive composition (F-1). Approximately 10 mg of the obtained adhesive composition was dissolved into approximately 1.0 g of 1,1,2,2-tetrachloroethane-d2 (TCE) to be used as a sample solution. Using an NMR (nuclear magnetic resonance) spectrometer (manufactured by Bruker BioSpin K.K., AVANVE 400-type Fourier transform nuclear magnetic resonance spectrometer), a proton nuclear magnetic resonance (1H-NMR) spectrum and a carbon nuclear magnetic resonance (13C-NMR) spectrum from the sample solution were measured at 80° C. In the obtained spectrum, signals of around 3.8 ppm to 3.9 ppm and around 70.6 ppm to 70.8 ppm, respectively, produced by a secondary hydroxyl group was observed and thus it was confirmed that a carboxyl group of PU-1 and an epoxy group of Bondfast CG5001 reacted. Further, the adhesive composition was adjusted to a thickness of 2 mm and a central portion thereof was dyed with Rua, and an ultra-thin piece was made using a cryo-ultramicrotome (manufactured by Leica Corporation, EMFC7). FIG. 1 shows a result of observation of the ultra-thin piece using a transmission electron microscope (manufactured by JEOL Ltd., JEM-z2500) at a magnification of 20,000.

Example 2

Preparation of Adhesive Composition (F-2)

An adhesive composition (F-2) was obtained similarly to Example 1, except that PU-1 and Bondfast CG5001 were blended such that PU-1/CG5001=70/30 and that the heating and kneading in the Labo Plastomill was performed at 190° C. for three minutes. Similarly to Example 1, a reaction between a carboxyl group of PU-1 and an epoxy group of Bondfast CG5001 was confirmed.

Example 3

Preparation of Adhesive Composition (F-3)

An adhesive composition (F-3) was obtained similarly to Example 2, except that PU-1 and Bondfast CG5001 were blended such that PU-1/CG5001=50/50. Similarly to Example 1, a reaction between a carboxyl group of PU-1 and an epoxy group of Bondfast CG5001 was confirmed.

Example 4

Preparation of Adhesive Composition (F-4)

An adhesive composition (F-3) was obtained similarly to Example 2, except that PU-1 and Bondfast CG5001 were blended such that PU-1/CG5001=30/70. Similarly to Example 1, a reaction between a carboxyl group of PU-1 and an epoxy group of Bondfast CG5001 was confirmed.

Example 5

Preparation of Adhesive Composition (F-5)

An adhesive composition (F-5) was obtained similarly to Example 1, except that the kneading with the Labo Plastomill was for one minute at 190° C. Similarly to Example 1, a reaction between a carboxyl group of PU-1 and an epoxy group of Bondfast CG5001 was confirmed.

Example 6

Preparation of Adhesive Composition (F-6)

An adhesive composition (F-6) was obtained similarly to Example 1, except that the kneading with the Labo Plastomill was for two minutes at 190° C. Similarly to Example 1, a reaction between a carboxyl group of PU-1 and an epoxy group of Bondfast CG5001 was confirmed.

Example 7

Preparation of Adhesive Composition (F-7)

An adhesive composition (F-7) was obtained similarly to Example 1, except that the kneading with the Labo Plastomill was for three minutes at 190° C. Similarly to Example 1, a reaction between a carboxyl group of PU-1 and an epoxy group of Bondfast CG5001 was confirmed.

Example 8

Preparation of Adhesive Composition (F-8)

An adhesive composition (F-8) was obtained similarly to Example 1, except that the kneading with the Labo Plastomill was for five minutes at 190° C. Similarly to Example 1, a reaction between a carboxyl group of PU-1 and an epoxy group of Bondfast CG5001 was confirmed.

Example 9

Preparation of Adhesive Composition (F-9)

WPU-1 and Sepolsion G315 (manufactured by Sumitomo Seika Chemicals Co., Ltd, an emulsion of bondfast CG-5001, non-volatile matter 40%) were blended such that WPU-1/G315=90/10 (solid content ratio), and then water was removed to obtain a solid content. In order to react WPU-1 and G315, and to obtain a complex, they were heated and kneaded at 190° C. for one minute, using a Labo Plastomill (Toyo Seiki Seisaku-sho, Ltd./Labo Plastomill 4C150), to obtain an adhesive composition (F-10). Note that, similarly to Example 1, a reaction between a carboxyl group of PU-1 and an epoxy group of Sepolsion G315 was confirmed by an NMR measurement.

Example 10

Preparation of Adhesive Composition (F-10)

Water was removed from Sepolsion G315 to obtain a solid content. PU-1 and the solid content of Sepolsion G315 were blended such that PU-1/G315=90/10. In order to react PU-1 and G315 to obtain a complex, they were heated and kneaded at 190° C. for one minute, using a Labo Plastomill (Toyo Seiki Seisaku-sho, Ltd./Labo Plastomill 4C150), to obtain an adhesive composition (F-10). Note that, similarly to Example 1, a reaction between a carboxyl group of PU-1 and an epoxy group of Sepolsion G315 was confirmed by an NMR measurement.

Example 11

Preparation of Adhesive Composition (F-11)

An adhesive composition (F-11) was obtained similarly to Example 10, except that the kneading with the Labo Plastomill was for two minutes at 190° C. Similarly to Example 10, a reaction between a carboxyl group of PU-1 and an epoxy group of Sepolsion G315 was confirmed.

Example 12

Preparation of Adhesive Composition (F-12)

An adhesive composition (F-12) was obtained similarly to Example 1, except that a solid content (PU-2) obtained by using WPU-2 instead of WPU-1 was used. The solid content (PU-2) of WPU-2 was obtained with a method similar to the method used for the solid content (PU-1) of WPU-1. Similarly to Example 1, a reaction between a carboxyl group of PU-2 and an epoxy group of Bondfast CG5001 was confirmed.

Example 13

Preparation of Adhesive Composition (F-13)

In a reactor provided with an agitator, a thermometer, a nitrogen seal pipe and a cooler, 344 parts of PTG-2000, 126 parts of IPDI, and 0.03 parts of DBTDL were placed and reacted at 80° C. for two hours. Then, after having cooled this reaction liquid to 50° C., 23.5 parts of DMPA, 17.7 parts of TEA, and 194 parts of acetone were added and reacted for four hours. Further, 216 parts of acetone was added to this reaction liquid and cooled to 30° C., and a mixture including 40.94 parts of IPDA, 103 parts of IPA, and, 778 parts of water was added and stirred at a high speed, and a polyurethane dispersion was obtained. After blending Sepolsion G315 into the polyurethane dispersion such that dispersion/G315=90/10 (solid content ratio), the mixture was heated to 50° C. to allow a reaction between polyurethane and an ethylene-glycidyl methacrylate copolymer and acetone and IPA were removed from this liquid by evaporation, and an aqueous polyurethane-polyolefin complex emulsion WPO-1 with solid content 40% and a viscosity coefficient of 400 mPa·s/25° C. was obtained.

WPO-1 was allowed to stand for 24 hours at 23° C. under a 50% RH atmosphere and thereafter for 24 hours at 60° C. in a constant-temperature bath, and water was removed to obtain an adhesive composition (F-13). Similarly to Example 1, by an NMR measurement, a reaction between an amino group of polyurethane and an epoxy group of Sepolsion G315 was confirmed.

Example 14

Preparation of Adhesive Composition (F-14)

An aqueous polyurethane-polyolefin complex emulsion WPO-2 with a solid content of 40% and a viscosity coefficient of 400 mPa·s/25° C. was obtained similarly to Example 13, except that it was blended such that dispersion/G315=80/20 (solid content ratio), and an adhesive composition (F-14) was obtained using WPO-2. Similarly to Example 1, by an NMR measurement, a reaction between an amino group of polyurethane and an epoxy group of Sepolsion G315 was confirmed.

Example 15

Preparation of Adhesive Composition (F-15)

An aqueous polyurethane-polyolefin complex emulsion WPO-3 with a solid content of 40% and a viscosity coefficient of 380 mPa·s/25° C. was obtained similarly to Example 13, except that except that 26.0 parts of DMBA was used instead of DMPA, and an adhesive composition (F-15) was obtained using WPO-3. Similarly to Example 1, by an NMR measurement, a reaction between an amino group of polyurethane and an epoxy group of Sepolsion G315 was confirmed.

Comparative Example 1

Preparation of Adhesive Composition (CF-1)

PU-1 and G201 (manufactured by Sumitomo Chemical Co., Ltd., a low density polyethylene) were blended such that PU-1/G201=90/10. A mixture of PU-1 and G201 was heated and kneaded with a Labo Plastomill (Toyo Seiki Seisaku-sho, Ltd./Labo Plastomill 4C150) for two minutes at 190° C. and an adhesive composition (CF-1) was obtained.

Comparative Example 2

Preparation of Adhesive Composition (CF-2)

An adhesive composition (CF-2) was obtained similarly to comparative example 1, except that a kneading time with the Labo Plastomill was four minutes at 190° C.

Comparative Example 3

Preparation of Adhesive Composition (CF-3)

An adhesive composition (CF-3) was obtained similarly to comparative example 1, except that a kneading time with the Labo Plastomill was six minutes at 190° C.

Comparative Example 4

Preparation of Adhesive Composition (CF-4)

WPU-1 and Sepolsion G315 were blended such that WPU-1/G315=90/10 (solid content ratio), and then allowed to stand for 24 hours at 23° C. under a 50% RH atmosphere and then allowed to stand for 24 hours at 60° C. in a constant-temperature bath. Water was removed and an adhesive composition (CF-4) was obtained. The result of nuclear magnetic resonance measurement showed that, in this example, it was confirmed that there was no reaction between a carboxyl group included in WPU-1 and an epoxy group in Sepolsion G315.

Comparative Example 5

Preparation of Adhesive Composition (CF-5)

An adhesive composition (CF-5) was obtained similarly to comparative example 4, except that WPU-1 and Sepolsion G315 were blended such that WPU-1/G315=70/30 (solid content ratio).

T-Peel Test

A T-peel test specimen was made by cutting each adhesive composition to have a thickness of approximately 1 mm, sandwiching it with two pieces of EPDM sheet (thickness 2 mm×width 25 mm×length 200 mm), and being processed for 30 minutes at a heating temperature of 150° C., and with a pressing pressure of 30 kgf/cm$^2$ using a test pressing machine (Tester Sangyo Co., Ltd./SA302), and thereafter allowed to stand for 12 hours at 23° C. The obtained specimen was subject to a T-peel test in conformity with JIS K6854-3 and a status of break at the surface of contact was measured.

This result was shown in Tables 1 and 2.

TABLE 1

| MASS (%) | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| URETHANE PREPOLYMER (FILM) PU-1 | 90 | 70 | 50 | 30 | 90 | 90 | 90 | 90 |
| URETHANE PREPOLYMER (FILM) PU-2 | | | | | | | | |
| URETHANE PREPOLYMER (EMULSION) WPU-1 (SOLID CONTENT) | | | | | | | | |
| BONDFAST CG5001 | | | | | | | | |
| SEPOLSION G315 (EMULSION) (SOLID CONTENT) | 10 | 30 | 50 | 70 | 10 | 10 | 10 | 10 |
| SEPOLSION G315 (FILM) | | | | | | | | |
| URETHANE-POLYOLEFIN COMPLEX (EMULSION) WPO-1 | | | | | | | | |
| URETHANE-POLYOLEFIN COMPLEX (EMULSION) WPO-2 | | | | | | | | |
| URETHANE-POLYOLEFIN COMPLEX (EMULSION) WPO-3 | | | | | | | | |
| LABO PLASTOMILL PROCESSING TIME (MIN) | 4 | 3 | 3 | 3 | 1 | 2 | 3 | 5 |
| T-PEEL TEST | A | A | B | B | A | A | A | B |

| MASS (%) | EXAMPLE 9 | EXAMPLE 10 | EXAMPLE 11 | EXAMPLE 12 | EXAMPLE 13 | EXAMPLE 14 | EXAMPLE 15 |
|---|---|---|---|---|---|---|---|
| URETHANE PREPOLYMER (FILM) PU-1 | | 90 | 90 | | | | |
| URETHANE PREPOLYMER (FILM) PU-2 | | | | 90 | | | |

TABLE 1-continued

| | | | | | | | |
|---|---|---|---|---|---|---|---|
| URETHANE PREPOLYMER (EMULSION) WPU-1 (SOLID CONTENT) | 90 | | | | | | |
| BONDFAST CG5001 | | | | 10 | | | |
| SEPOLSION G315 (EMULSION) (SOLID CONTENT) | 10 | | | | | | |
| SEPOLSION G315 (FILM) | | 10 | 10 | | | | |
| URETHANE-POLYOLEFIN COMPLEX (EMULSION) WPO-1 | | | | | 100 | | |
| URETHANE-POLYOLEFIN COMPLEX (EMULSION) WPO-2 | | | | | | 100 | |
| URETHANE-POLYOLEFIN COMPLEX (EMULSION) WPO-3 | | | | | | | 100 |
| LABO PLASTOMILL PROCESSING TIME (MIN) | 1 | 1 | 2 | 4 | — | — | — |
| T-PEEL TEST | B | A | B | A | A | A | A |

TABLE 2

| MASS (%) | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| URETHANE PREPOLYMER (FILM) PU-1 | 90 | 90 | 90 | 90 | 70 |
| SEPOLSION G315 (FILM) | | | | 10 | 30 |
| LOW DENSITY POLYETHYLENE (G201) | 10 | 10 | 10 | | |
| LABO PLASTOMILL PROCESSING TIME (MIN) | 2 | 4 | 6 | — | — |
| T-PEEL TEST | C | C | C | C | C |

Evaluation Criteria:
A: The percentage of an area that showed a break in EPDM at an adhesive-applied part is greater than or equal to 50%
B: The percentage of an area that showed a break in EPDM at an adhesive-applied part is less than 50% and greater than or equal to 5%
C: The percentage of an area that showed a breakage in EPDM at an adhesive-applied part is less than 5%

It can be seen from Tables 1 and 2 that an adhesive composition obtained by a reaction between urethane prepolymer and polyolefin has a good adhesiveness, with a breakage of a material in a T-peel test. Good adhesiveness as described above was obtained for adhesive compositions (Examples 1 to 12) obtained from a polyurethane-polyolefin complex that is a reaction product of a solid content of polyurethane and a solid content of polyolefin and also for adhesive compositions (Examples 13 to 15) obtained from an aqueous polyurethane-polyolefin complex emulsion.

Figure 2:
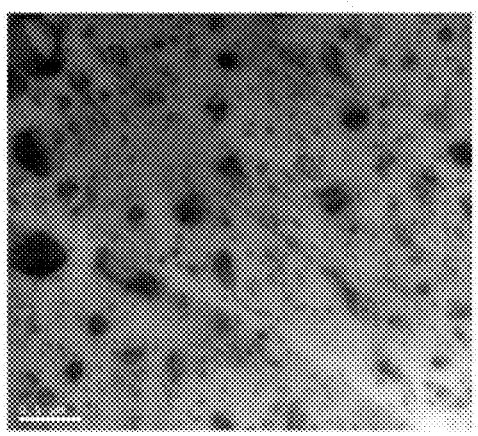
FIG. 2 shows a transmission electron microscopic image of an adhesive of Example 8.
Figure 3:
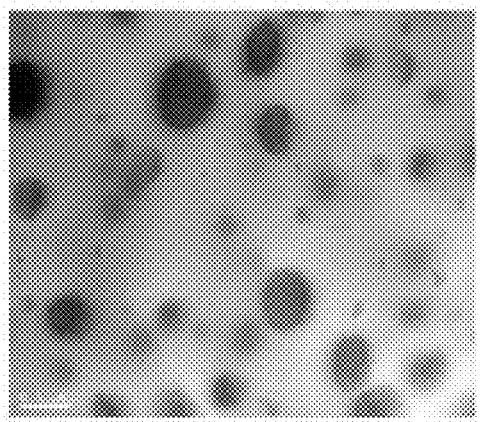
FIG. 3 shows a transmission electron microscopic image of an adhesive of Comparative Example 2.

For each of the adhesive compositions of examples 1, 8 and comparative example 2, a surface thereof was observed using a transmission electron microscope, and it was confirmed that polyurethane existed as a continuous phase and polyolefin existed as a dispersed phase that is dispersed in the continuous phase as shown in FIGS. 1 to 3. A number of polyolefin having a long diameter of less than or equal to 100 nm in a surface of 3.0 μm×3.0 μm in the image was counted. As a result, it was 400 to 450 for Example 1 for which the T-peel test showed "A", and 100 to 150 for Example 8 for which the T-peel test showed "B". In contrast, for Comparative Example 2, the number was six. From the above, a good result in the T-peel test was obtained when the number of the polyolefin having a long diameter of less than or equal to 100 nm was 100 or more per 3.0 μm×3.0 μm. Note that softening points of the adhesive compositions of Examples 1, 8, and Comparative Example 2 were 129° C., 138° C., and 132° C., respectively.

What is claimed is:
1. An adhesive composition comprising a polyurethane-polyolefin complex that comprises a polyurethane having a first functional group and a polyolefin having a second functional group, wherein the second functional group reacts with the first functional group, and wherein the polyurethane and the polyolefin are bound by the reaction between the first functional group and the second functional group;
wherein a combination of the first functional group and the second functional group is one of (carboxyl group, hydroxyl group), (hydroxyl group, carboxyl group), (carboxyl group, epoxy group), (acid anhydride group, epoxy group), (epoxy group, carboxyl group), (epoxy group, acid anhydride group), (amino group, epoxy group), (isocyanate group, hydroxyl group), (isocyanate group, epoxy group), or (epoxy group, amino group);
wherein the polyurethane having the first functional group includes
(1-i) 5 to 40 mass % of a constitutional unit derived from at least one kind of polyisocyanate,
(1-ii) 1 to 20 mass % of a constitutional unit derived from at least one kind of a compound represented by general formula (I) below, and
(1-iii) 10 to 80 mass % of a constitutional unit derived from at least one kind of polyol that is different from the (1-ii)-component:

[Chemical Formula 1]

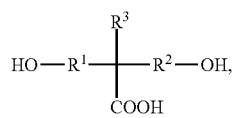
(I)

where $R^1$ and $R^2$ each represents a $C_1$-$C_4$-alkylene group independently and respectively, and $R^3$ represents a $C_1$-$C_4$-alkyl group; and
  wherein the polyolefin having the second functional group includes
  (2-i) 50 to 97 mass % of a constitutional unit derived from $C_2$-$C_{20}$-α-olefin,
  (2-ii) 3 to 30 mass % of a constitutional unit derived from at least one kind of a compound represented by general formula (II) below, and
  (2-iii) 0 to 30 mass % of a constitutional unit derived from another monomer that can be copolymerized except vinyl acetate:

[Chemical Formula 2]

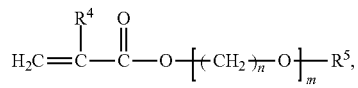
(II)

where $R^4$ represents hydrogen or a methyl group and $R^5$ is any one of general formulae (IIa) to (IIc) below:

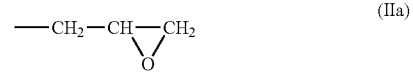
(IIa)

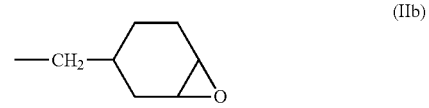
(IIb)

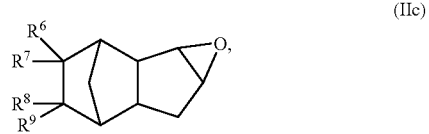
(IIc)

where n is an integer of 2 to 4, m is an integer of 0 or 1 to 5, any one of $R^6$, $R^7$, $R^8$ and $R^9$ represents a bonding position with an oxyalkylene group of the aforementioned general formula (II) and another group represent an alkyl group of hydrogen or carbon number of 1 to 10.

* * * * *